(12) United States Patent
Murray et al.

(10) Patent No.: US 10,363,859 B2
(45) Date of Patent: Jul. 30, 2019

(54) VEHICLE LOADSPACE COVER WITH CARGO FIXING POINT

(71) Applicant: Ford Global Technologies, LLC, Dearborn, MI (US)

(72) Inventors: James Nicholas Murray, Chelmsford (GB); James Neugebauer, Chelmsford (GB); Bruce Southey, Farnham (GB); Richard Craven, Chelmsford (GB); Andrew John Murray, Colchester (GB); Ian Brazier, Chelmsford (GB)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/727,855

(22) Filed: Oct. 9, 2017

(65) Prior Publication Data

US 2018/0099603 A1 Apr. 12, 2018

(30) Foreign Application Priority Data

Oct. 12, 2016 (GB) .................................. 1617317.1

(51) Int. Cl.
*B60P 7/08* (2006.01)
*B60R 5/04* (2006.01)

(52) U.S. Cl.
CPC ............ *B60P 7/0807* (2013.01); *B60R 5/045* (2013.01); *B60R 5/047* (2013.01)

(58) Field of Classification Search
CPC ........... B60R 13/01; B60R 3/02; B60R 5/041; B60R 5/045; B60P 7/0815; B60P 7/0807; B60P 7/0823; B60P 7/15; B60P 7/083; B60P 7/0892; B60P 3/073; B60P 3/40
USPC ........ 410/102, 106, 104, 101, 110, 111, 115, 410/97, 98, 81; 248/503, 503.1, 499, 248/500, 539, 222.2, 424, 542
See application file for complete search history.

(56) References Cited

U.S. PATENT DOCUMENTS

| 4,277,097 A * | 7/1981 | Lalanne ................. B60R 5/045 224/542 |
| 6,508,499 B1 * | 1/2003 | Guanzon .................. B60R 5/04 296/37.1 |
| 6,578,896 B1 * | 6/2003 | Peterson ............... B60R 13/011 296/208 |
| 6,644,709 B2 * | 11/2003 | Inagaki ................ B60N 2/3013 296/37.14 |
| 6,837,531 B2 | 1/2005 | Mack et al. |
| 8,414,049 B2 | 4/2013 | Parker |
| 8,474,896 B2 | 7/2013 | Ostberg |
| 8,840,166 B1 | 9/2014 | Derbes et al. |
| 2009/0039675 A1 | 2/2009 | King et al. |
| 2017/0129415 A1 * | 5/2017 | Maldonado Cruz ...... B60R 5/04 |

(Continued)

FOREIGN PATENT DOCUMENTS

| DE | 10343144 A1 | 1/2005 |
| EP | 1010581 A2 | 6/2000 |
| EP | 1800940 A2 | 6/2007 |

(Continued)

*Primary Examiner* — D Glenn Dayoan
*Assistant Examiner* — Sunsurraye Westbrook
(74) *Attorney, Agent, or Firm* — Vichit Chea; Price Heneveld LLP

(57) ABSTRACT

A vehicle loadspace cover is provided that is securable to a portion of a vehicle. The loadspace cover comprises a cargo fixing point configured to secure an item of cargo to the loadspace cover.

12 Claims, 1 Drawing Sheet

(56) References Cited

U.S. PATENT DOCUMENTS

2018/0111564 A1\* 4/2018 Merino .................... B60R 9/10
2018/0257592 A1\* 9/2018 Miranda Nieto ......... B60R 5/04

FOREIGN PATENT DOCUMENTS

| JP | 2002160564 A | | 6/2002 |
|---|---|---|---|
| JP | 2016124525 A | \* | 7/2016 |
| WO | 2004011305 A1 | | 2/2004 |

\* cited by examiner

VEHICLE LOADSPACE COVER WITH CARGO FIXING POINT

FIELD OF THE INVENTION

The present invention generally relates to a vehicle loadspace cover, and more particularly relates to retractable loadspace cover that can be used to secure an item of cargo in a loadspace of a vehicle.

BACKGROUND OF THE INVENTION

It is common for a vehicle to have a rear seat that can be folded forward to increase the size of a loadspace of the vehicle. It is also common for some vehicles to have a loadspace cover that can be deployed over the loadspace, for example from the back side of the rear seats, to cover any items that may be stowed in the loadspace.

When the rear seat is folded forward, it is usual to move the loadspace cover so that the cover does not prevent larger items being loaded into the loadspace. However, a problem may arise in finding a suitable space to store the loadspace cover. For example, it is common for an individual to store the loadspace cover in the loadspace, which decreases the amount of usable space in the loadspace. Alternatively, an individual may remove the loadspace cover from the vehicle entirely, so that the loadspace cover does not take up space in the loadspace or move around the loadspace during transit. However, removing the loadspace cover from the vehicle may be undesirable, for example when the individual is on a one-way trip.

Another problem an individual may face is how to secure an item of cargo in the loadspace so that the item does not shift about during transit. It is desirable, therefore, to prevent the item of cargo, and/or a loadspace cover stowed in the loadspace, from moving around during transit of the vehicle.

SUMMARY OF THE INVENTION

According to one aspect of the present invention, a vehicle loadspace cover is provided. The vehicle loadspace cover includes vehicle fixing points for removably securing to at least one of a loadspace floor of a vehicle and a seat of the vehicle, and a cargo fixing point configured to secure an item of cargo to the loadspace cover.

According to another aspect of the present invention, a vehicle is provided that includes a loadspace, and a loadspace cover to cover at least a portion of the loadspace. The loadspace includes vehicle fixing points for removably securing the cover to at least one of a loadspace floor of a vehicle and a seat of the vehicle, and a cargo fixing point configured to secure an item of cargo to the loadspace cover.

According to a further aspect of the present invention, a method of securing cargo to a vehicle is provided. The method includes the steps of removably securing a vehicle loadspace cover to at least one of a loadspace floor of the vehicle and a seat of the vehicle, and securing an item of cargo to a cargo fixing point of the vehicle loadspace cover.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
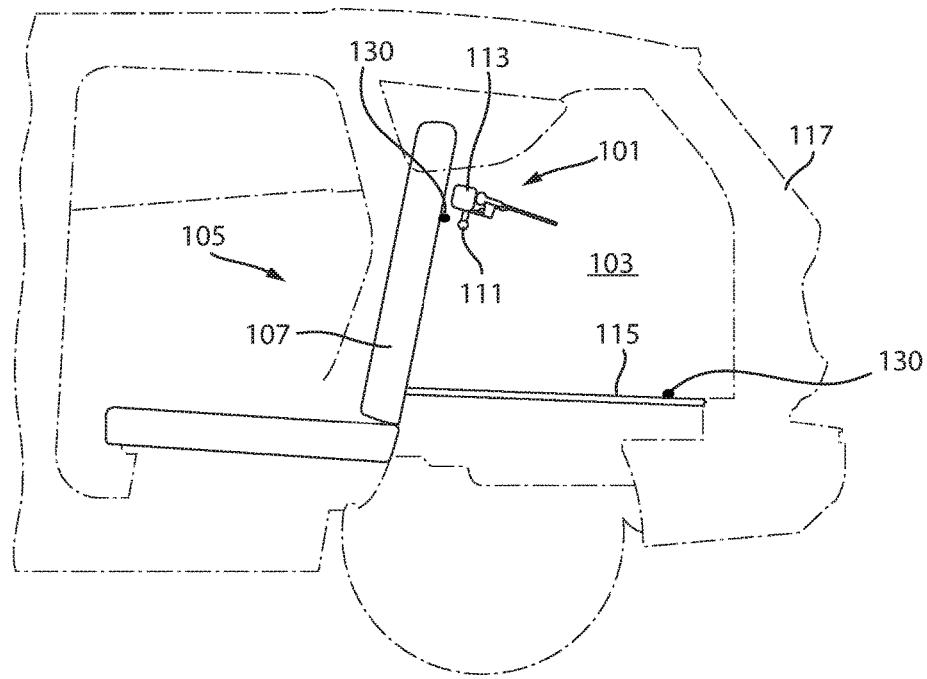
FIG. 1 is a partial side view of a vehicle having a vehicle loadspace cover secured behind a rear seat of the vehicle, according to one embodiment.
Figure 2:
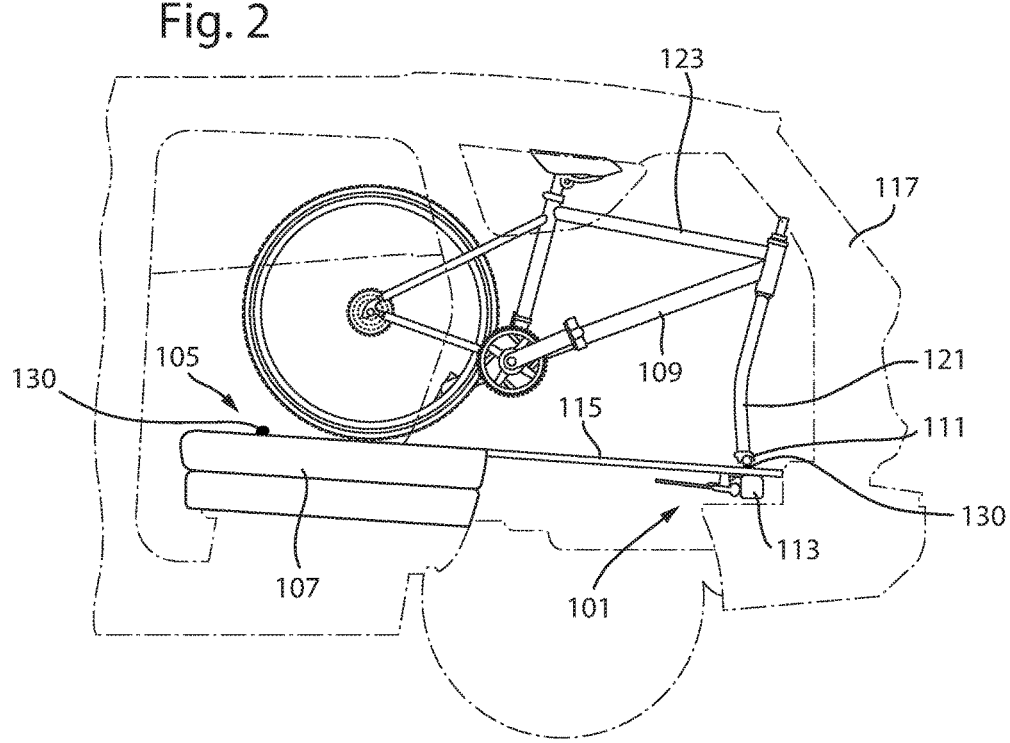
FIG. 2 is a partial side view of the vehicle with the vehicle loadspace cover secured to a loadspace floor of the vehicle.

The present disclosure provides a vehicle loadspace cover 101, for example a tonneau cover or a parcel shelf, which can be used to cover the loadspace 103 of a vehicle. In the arrangement shown in FIGS. 1 and 2, the vehicle has a rear seat 105, which has a seatback 107 that is moveable between an upright first position, as shown in FIG. 1, and a forward folded second position, as shown in FIG. 2. Folding of the rear seat 105 to the folded second position is desirable as it increases the size of the loadspace 103 of the vehicle, which is convenient when an individual wishes to transport a large item of cargo 109 in the vehicle, such as a bicycle, and/or a number of items of cargo 109 that would not otherwise fit in the loadspace 103 when the rear seat 105 is in the first position.

A common problem is that when the seatback 107 has been moved to the folded second position, e.g., a stowed position, the loadspace cover 101 can restrict the useable space in the rear of the vehicle since the cover extends across at least a portion of the loadspace 103. For example, the loadspace cover in the form of a parcel shelf or tonneau cover may be configured to attach to fixing points on the body of the vehicle, so that it is able to cover a desired portion of the loadspace 103. In the arrangement shown in FIGS. 1 and 2, the loadspace cover 101 is secured at vehicle fixing points to the interior side walls of the body of the vehicle so that it extends laterally across the loadspace 103. However, the loadspace cover 101 may be attached to any appropriate portion of the vehicle.

The loadspace cover 101 may be a retractable loadspace cover 101 that can be pulled out to extend over a desired portion of the loadspace 103. In FIGS. 1 and 2, the loadspace cover 101 is shown in a retracted position. However, it is understood that the loadspace cover 101 may be deployed to cover any appropriate portion of the loadspace 103. In one or more other arrangements (not shown) the loadspace cover 101 may be a tonneau cover configured for use with a loadspace of a pick-up truck, or a lid of a cargo carrier, for example a roof box, for a vehicle. It is understood, therefore, that the loadspace cover 101 according to the present disclosure may be any appropriate type of loadspace cover 101 configured for use with one or more types of vehicles. Further, the loadspace cover 101 may comprise any appropriate number of portions. For example, the loadspace cover 101 may comprise at least one of a rigid portion, a flexible portion, a foldable portion and a retractable portion.

Another common problem is that an item of cargo 109 is able to move around the loadspace 103 during transit of the vehicle. As such, it is desirable to secure the cargo 109 in the loadspace 103 so that the cargo 109 and/or the vehicle are not damaged during transit. For example, it is known to provide straps and/or cords that are configured to restrict movement of cargo 109 when attached to the body of the vehicle. However, such straps and/or cords must be carried and stowed on the vehicle.

The present disclosure is advantageous as it provides a loadspace cover 101 having at least one cargo fixing point 111 configured to secure an item of cargo 109 to the loadspace cover 101. In the arrangement shown in FIG. 1, the loadspace cover 101 has a cargo fixing point 111 that depends from a body portion 113 of the loadspace cover 101. In this manner, one or more items of cargo 109 can be secured to the underside of the loadspace cover 101 using the cargo fixing point 111. The cargo fixing point 111 may comprise at least one of a hook, an eyelet, a catch, a latch, a strap, a cord, and any other appropriate type of fixing point that can be used to secure an item of cargo 109 to the loadspace cover 101. The loadspace cover 101 may comprise any appropriate number of cargo fixing points 111, each cargo fixing point being positioned on any appropriate face of the loadspace cover 101. For example, the loadspace cover 101 may comprise a first cargo fixing point that extends in a first direction, e.g. towards a loadspace floor 115 of the loadspace 103, and a second fixing point that extends in another direction, e.g. towards the tailgate 117 of the vehicle. In one arrangement, an extendable portion of the loadspace cover 101 may comprise the cargo fixing point 111, so that the loadspace cover 101 may be extended towards and attached to the item of cargo 109 to secure the item of cargo 109 in position during transit on the vehicle.

In a situation where the loadspace cover 101 restricts access to loadspace 103, an individual can remove the loadspace cover 101 from the vehicle fixing points of the vehicle so as to increase the usable loadspace 103. However, with the loadspace cover 101 removed from the fixing points of the vehicle, the individual has to find a suitable space to store the loadspace cover 101 once removed from the fixing points. In some cases, the individual may store the removed loadspace cover 101 in the loadspace 103, which decreases the amount of usable space in the loadspace 103. Further, when the loadspace cover 101 is stored in the loadspace 103, it may move about during transit and cause damage to other items of cargo 109 stowed in the loadspace 109.

Alternatively, an individual may remove the loadspace cover 101 from the vehicle entirely, so that the loadspace cover 101 does not take up space in the loadspace 103 or move around the loadspace 103 during transit. However, removing the loadspace cover 101 from the vehicle may be undesirable, for example when the individual is on a one-way trip, and/or when the individual has no suitable place to store the loadspace cover 101 when removed from the vehicle.

In the arrangement shown in FIG. 2, the loadspace cover 101 has been removed from the vehicle fixing points of the vehicle to increase the usable volume of the loadspace 103. The present disclosure is advantageous as the loadspace cover 101 is configured to be coupled to a portion of the vehicle using the cargo fixing point 111. For example, the loadspace cover 101 may be configured to attach to the loadspace floor 115 by virtue of at least one cargo fixing point 111, when the loadspace cover 101 has been removed from the fixing points of the vehicle. In this manner, the cargo fixing point 111 is configured to secure the loadspace cover 101 in place during transit on the vehicle to prevent the loadspace cover from moving about when removed from the vehicle fixing points. Additionally, the cargo fixing point 111 may be used to secure one or more items of cargo to the loadspace cover 101. However, in another arrangement, the loadspace cover 101 may be configured to attach to a portion of the vehicle using one or more other fixing points instead of, or in combination with, the cargo fixing point 111.

In the arrangement of FIG. 2, the loadspace cover 101 is configured to attach to the underside of the loadspace floor 115 such that the cargo fixing point 111 extends through the loadspace floor 115 and into the loadspace 103 of the vehicle. In another arrangement, however, the cargo fixing point 111 may not extend through, for example entirely through, the loadspace floor 115, and the loadspace floor 115 may comprise at least one opening configured to allow sufficient access to the cargo fixing point 111 of the loadspace cover.

In the arrangement shown in FIG. 2, the cargo fixing point 111 comprises a connector configured to engage the front forks 121 of a bicycle 123. In this manner, when an individual wishes to transport a bicycle in the loadspace 103 of the vehicle, the individual can: a) fold the rear seat 105 to a stowed position to increase the usable area of the loadspace 103; b) remove the loadspace cover 101 so that it does not restrict access to the loadspace 103; c) stow the loadspace cover 101 underneath the loadspace floor 115 so that the loadspace cover 101 does not occupy usable space of the loadspace 103; d) secure the loadspace cover 101 to the loadspace floor 115 to avoid the loadspace cover 101 from shifting about during transit, for example by virtue of the cargo fixing point 111; and e) use the cargo fixing point 111 of the loadspace cover 101 to secure the bicycle in place during transit.

In another arrangement (not shown), the loadspace cover 101 may be securable to the seat back, so that when the seatback 107 is folded forwards, the cargo fixing point 111 can be used to secure the item of cargo 109 to the seatback 107. For example, where a bicycle 123 is loaded into the loadspace 103 in the opposite direction to that shown in FIG. 2, the loadspace cover 101 may be secured to the seatback 107 in a position that allows the front forks 121 of the bicycle 123 to engage a connector of the cargo fixing point 111. It is understood, however, that the loadspace cover 101 may be attached to any appropriate portion of the vehicle. For example, the vehicle may comprise a plurality of fixings points that allow the loadspace cover 101 to be secured to the vehicle at any appropriate position for the shape and/or size of the item of cargo 109. For example, the vehicle may comprise a rail having a plurality of fixing points that allow the loadspace cover to be secured in a plurality of lateral positions across the loadspace 103 of the vehicle. In this manner, the loadspace cover 101 may be placed at a location that is appropriate for the shape and/or size of the item of cargo 109.

According to one aspect of the present disclosure, there is provided a vehicle loadspace cover, such as a tonneau cover. The vehicle loadspace cover is removably securable to at least one of a loadspace floor of the vehicle and a seat of the vehicle, and comprises a cargo fixing point configured to secure an item of cargo to the loadspace cover.

The vehicle loadspace cover may be removably securable to a portion of the vehicle, for example a body portion and/or a portion of vehicle furniture. The vehicle loadspace cover may comprise at least one vehicle fixing point configured to engage the portion of the vehicle.

The vehicle loadspace cover may be removably securable to the loadspace floor of the vehicle by virtue of the cargo fixing point. The vehicle loadspace cover may be removably securable to the loadspace floor of the vehicle by virtue of one or more other fixing points of the loadspace cover, for example by virtue of the vehicle fixing point.

The vehicle loadspace cover may be removably securable to a back face and/or a top face of a vehicle seat. The vehicle loadspace cover may be removably securable to the seat of the vehicle by virtue of the cargo fixing point. The vehicle loadspace cover may be removably securable to the seat of the vehicle by virtue of one or more other fixing points of the loadspace cover, for example by virtue of the vehicle fixing point.

The vehicle loadspace cover may be moveable between a first position where the loadspace cover is attached to the portion of the vehicle, and a second position where the loadspace cover is attached to a loadspace floor of the vehicle. The cargo fixing point may be configured to fix cargo relative to the vehicle loadspace when the vehicle loadspace cover is in the first position. The cargo fixing point may be configured to fix cargo relative to the vehicle loadspace when the vehicle loadspace cover is in the second position.

The vehicle loadspace cover may be removably securable to the underside of the loadspace floor. The cargo fixing point may be configured to extend at least partially through the loadspace floor, for example when the vehicle loadspace cover is secured to the loadspace floor. The cargo fixing point may extend through the loadspace floor so that the loadspace floor is positioned in between the loadspace cover and the item of cargo when the item of cargo is secured to the cargo fixing point. The loadspace cover may be configured such that the action of securing cargo to the cargo fixing point also secures the loadspace cover to the loadspace floor. The cargo fixing point may be configured to restrict movement of the loadspace cover relative to the loadspace when the item of cargo is secured to the cargo fixing point.

The cargo fixing point may be configured in one embodiment to engage a bicycle, for example the front forks of the bicycle, the frame of the bicycle and/or the wheels of the bicycle.

The vehicle loadspace cover may be a retractable and/or foldable loadspace cover. For example, the vehicle loadspace cover may comprise an extendable portion that is deployable from a body portion of the loadspace cover. Each of the extendable portion and the deployable portion may comprise a cargo fixing point.

A vehicle such as a wheeled motor vehicle may be provided comprising one or more of the above mentioned vehicle loadspace covers.

According to another aspect of the present disclosure there is provided a method of securing cargo to a vehicle. The method includes removably securing a vehicle loadspace cover to at least one of a loadspace floor of the vehicle and a seat of the vehicle, and securing an item of cargo to a cargo fixing point of the vehicle loadspace cover.

In one arrangement there is provided a vehicle cargo system, the vehicle cargo system having a loadspace cover that is movable between a first position where it is deployable over a loadspace of the vehicle, and a second position where it is useable to secure an item of cargo to a loadspace floor of the vehicle.

In one arrangement there is provided a vehicle cargo system comprising a vehicle loadspace floor and a vehicle loadspace cover. The vehicle loadspace cover is securable to the vehicle loadspace floor. The vehicle loadspace cover comprises at least one cargo fixing point configured to secure an item of cargo to the loadspace cover. The cargo fixing point may act to secure the vehicle loadspace cover to the vehicle loadspace floor.

The vehicle cargo system may comprise one or more recesses, for example channels, that extend along the vehicle loadspace floor and/or along a portion of a seat of the vehicle. The one or more recesses may extend in an axial direction. The one or more recesses may extend in a vertical direction. The one or more recesses may extend in a lateral direction. The one or more recesses may be configured to limit the movement of the item of cargo when the item of cargo is placed at least partially in the recess. For example, the one or more recesses may be configured to engage a portion of a wheel of a bicycle to prevent the bicycle wheel from moving, e.g. laterally, relative the vehicle. The cargo fixing point may be configured to secure the item of cargo to the loadspace cover relative to the one or more recesses. The cargo fixing point may be configured to limit the movement of the item of cargo along a first axis. The recess may be configured to limit the movement of the item of cargo along a second axis. The first axis and the second axis may be inclined to each other. The first axis and the second axis may be perpendicular to each other.

It will be appreciated by those skilled in the art that although the disclosure has been described by way of example with reference to one or more arrangements, it is not limited to the disclosed arrangements and that alternative arrangements could be constructed without departing from the scope of the disclosure as defined by the appended claims.

It will be understood that any described processes or steps within described processes may be combined with other disclosed processes or steps to form structures within the scope of the present invention. The exemplary structures and processes disclosed herein are for illustrative purposes and are not to be construed as limiting.

What is claimed is:

1. A vehicle loadspace cover comprising:
   one or more vehicle fixing points for removably securing to at least one of a loadspace floor of a vehicle and a seat of the vehicle, wherein the loadspace cover is extendable to cover a loadspace of the vehicle when secured to the seat; and
   a cargo fixing point configured to secure an item of cargo to the loadspace cover, wherein the vehicle loadspace cover is removably securable to the underside of the loadspace floor and the cargo fixing point is configured to extend at least partially through the loadspace floor to secure the item of cargo.

2. The vehicle loadspace cover according to claim 1, wherein the vehicle loadspace cover is removably securable to a portion of the vehicle.

3. The vehicle loadspace cover according to claim 1, wherein the cargo fixing point is configured to engage a body portion of a bicycle.

4. The vehicle loadspace cover according to claim 1, wherein the vehicle loadspace cover is a retractable loadspace cover.

5. A vehicle comprising:
   a loadspace; and
   a loadspace cover to cover at least a portion of the loadspace, the cover comprising:
      one or more vehicle fixing points for removably securing the cover to at least one of a loadspace floor of a vehicle and a seat of the vehicle, wherein the loadspace cover is extendable to cover a loadspace of the vehicle when secured to the seat; and
      a cargo fixing point configured to secure an item of cargo to the loadspace cover, wherein the vehicle loadspace cover is removably securable to a portion of the vehicle and the vehicle loadspace cover is removably securable to the underside of the loadspace floor to secure the item of cargo.

6. The vehicle according to claim 5, wherein the cargo fixing point is configured to extend at least partially through the loadspace floor.

7. The vehicle according to claim 5, wherein the cargo fixing point is configured to engage a body portion of a bicycle.

8. The vehicle according to claim 5, wherein the vehicle loadspace cover is a retractable loadspace cover.

9. A method of securing cargo to a vehicle, comprising:
removably securing a vehicle loadspace cover to at least one of a loadspace floor of the vehicle and a seat of the vehicle, wherein the loadspace cover is extendable to cover a loadspace of the vehicle when secured to the seat; and securing an item of cargo to a cargo fixing point of the vehicle loadspace cover, wherein the vehicle loadspace cover is removably securable to a portion of the vehicle and the vehicle loadspace cover is removably securable to the underside of the loadspace floor to secure the item of cargo.

10. The method according to claim 9, wherein the cargo fixing point is configured to extend at least partially through the loadspace floor.

11. The method according to claim 9, wherein the cargo fixing point is configured to engage a body portion of a bicycle.

12. The method according to claim 9, wherein the vehicle loadspace cover is a retractable loadspace cover.

\* \* \* \* \*